United States Patent [19]

Aoki et al.

[11] Patent Number: 5,327,267
[45] Date of Patent: Jul. 5, 1994

[54] DIELECTRIC DISPLAY DEVICE HAVING ELECTRODES PROTECTED BY A STATIC CONDUCTOR

[75] Inventors: Keigo Aoki, Kyoto; Yoshinao Ohnuma, Nara, both of Japan

[73] Assignee: Sharp Kabushiki Kaisha, Osaka, Japan

[21] Appl. No.: 983,750

[22] Filed: Dec. 1, 1992

[30] Foreign Application Priority Data

Dec. 3, 1991 [JP] Japan ................... 3-318992

[51] Int. Cl.$^5$ .......................................... G02F 1/1343
[52] U.S. Cl. ........................................ 359/59; 359/54; 359/84; 359/87
[58] Field of Search ................ 359/54, 59, 87, 88, 359/84

[56] References Cited

U.S. PATENT DOCUMENTS 5,148,299  9/1992  Terada ........................ 259/88

FOREIGN PATENT DOCUMENTS 54-141155  2/1979  Japan .
28817  3/1990  Japan .
2193112  7/1990  Japan .
2221927  11/1990  Japan .
3260624  11/1991  Japan .

Primary Examiner—William L. Sikes
Assistant Examiner—Huy Mai

[57] ABSTRACT

A dielectric display device includes a pair of substrates, at least one of which is transparent, spaced in parallel a constant distance apart, and facing each other. A dielectric display material is inserted between the pair of substrates. Further, a pair of electrodes, at least one of which includes a plurality of line (or scanning) electrodes, are disposed on the sides of the substrate facing the other substrate. Finally, a static erasing conductor is disposed extending peripherally along, and spaced a constant distance from, the ends of the electrodes for preventing intrusion of static electricity into electric lead lines.

4 Claims, 9 Drawing Sheets

DIELECTRIC DISPLAY DEVICE HAVING ELECTRODES PROTECTED BY A STATIC CONDUCTOR

BACKGROUND OF THE INVENTION

Field of the Invention

The present invention relates to a dielectric display device, such as a liquid crystal cell and the like.

Description of Related Art

A dielectric display device of this kind used to date has a structure comprising: top and bottom substrates, at least one of which is transparent, being disposed in parallel with a constant distance apart a dielectric display material where members such as an insulator ferroelectrics and semiconductor are, being disposed between the pair of substrates; and a pair of electrodes, at least one of which made of a plurality of line electrodes, being disposed on respective substrate surfaces.

When a dielectric display device having a structure described above, is applied with selective voltages between the electrodes on the pair of substrate surfaces, the dielectric display material inserted between the substrates changes its state from an initial phase to another phase. The variation of the state causes a change of the optical characteristics of the dielectric display material, including refraction of index, behavior of birefringence, etc. which can be used for a particular visual display device. However, there occurs static electricity on the substrate when, in a preparing process of a liquid crystal cell, the substrates need be subjected to a rubbing treatment in which the surface of substrate is rubbed lightly in a direction with a cotton fabric for the purpose of aligning the molecules of the liquid crystal. Meanwhile, thin film transistors (to be abbreviated generally as TFT) and other devices having an MIM (Metal Insulator Metal) structure, have become predominantly used in recent years as a switching device for applying selective voltages to the display electrodes of a liquid crystal cell. Such a switching device tends to have a voltage difference formed based on the aforementioned static electricity, particularly in a position where the interval of the electrodes are small. This voltage difference causes a discharge to thereby deteriorate the dielectric display material in its quality of display, shift switching characteristics, or, at worst, damage the switching device.

Japanese Patent No.1,163,234 discloses a process for preparing a dielectric display device in which an accumulation of static charges, which would have occurred in conventional liquid crystal cells in forming wiring substrates as stated above, can be prevented. This thus inhibits the discharge in the insulator, semiconductor or the like from arising. The dielectric display device according to the Japanese Patent No. 1,163,234 comprises, as shown in FIG. 1 which will be referred to hereinafter, a liquid crystal (not shown) being hermetically confined between glass substrates 2 and 3 opposed to each other, transparent display electrodes (not shown) being disposed on facing surfaces of respective substrates 2 and 3, and switching devices (not shown) such as TFTs or the like for applying selective voltages to the display electrodes. Electric lead lines 4 connected at their ends to each of the display electrodes and switching devices, extend to the periphery of the glass substrate 3 to be joined together at their other ends by a common short-circuit section 5.

In a case where a liquid crystal cell with a twisted nematic type liquid crystal, sealed between the glass substrates 2 and 3, is prepared in the manner described above, that is, by providing a short-circuit section 5 to which all electric lead lines 4 are joined together, even if static electricity is generated by the rubbing treatment for the glass substrate 3, no particular electrode accumulates static charges since all the display electrodes and switching devices (not shown) are at equipotential due to the presence of the short-circuit section 5.

The Japanese Patent No. 1,163,234 also describes that, as shown in FIG. 2 to be referred to hereinafter, the periphery of the glass substrate 3 including the short-circuit section 5 is cut out in a thickness direction so as to make individual electric lead lines 4 separate before the following steps are executed. In a step, for example, at which the liquid crystal cell 1 is provided with driver integrated circuits as shown in FIG. 3 to be referred to hereinafter, there is a fear that a potential difference might occur due to static electricity caused by, for example, an operator's finger or any conductor with which the liquid cell 1 contacts in a processing apparatus. For this reason, in order to prevent a potential difference from occurring between the aforementioned conductor and the liquid crystal cell 1, there have been several measures taken, such as grounding the operator's body or the apparatus, disposing a discharging blower or discharging bar for generating positive ions or negative ions to eliminate the static charges appearing on the liquid crystal cell 1, or other method.

In cutting the peripheral short-circuit section of the aforementioned conventional dielectric display device, e.g., a liquid crystal cell, there is another fear in that orientation films near electrodes in the liquid crystal cell, and dielectric display material of such as an insulator, ferroelectric substance, or semiconductor held between the electrodes might be damaged by the static electricity which is generated in cutting process by a rotating diamond cutter etc.

In the liquid crystal cell 1 from which the short-circuit portion 5 has been removed, static electric charges may be brought into the liquid crystal cell 1 when the electric lead lines 4 exposed outside mistakenly come into contact with an operator's finger or other conductors in the processing apparatus etc.

To overcome this difficulty, in a case where, as shown in FIG. 3, driver integrated circuits (which will be called simply as "driver ICs") provided in the liquid crystal cell 1 (refer to FIG. 2) from which the peripheral short-circuit section is removed are of the Chip-On-Film (which will be referred to as "COF") type; tape carrier packages (which will be referred to as "TCPs") 10 are arranged on the liquid crystal cell 1 from which the short-circuit section 5 has been removed. With the provision of the TCPs 10 to each of the driver ICs, (here, four driver ICs are equipped, for example, in view of the relation between the number of pixels and the packaging density, to respective sides of the square liquid crystal cell 1), the electric lead lines 4 being exposed outside can be kept from the static electricity which could would be brought from without.

Nevertheless, in a case where the Chip-On-Glass type arrangement in which a scanning side IC 15 and a signal side IC 16, both work as driver ICs for driving the liquid crystal cell 1, are mounted directly on the glass substrate 3, if the short-circuit section 5 is formed on the sides in which the scanning side IC 15 and the signal side IC 16 are disposed, this necessitates employment of a multi-layered inter-connection, resulting in an increase of steps and a decrease of production yield. For this reason, it is necessary to form the short-circuit section 5 on the sides to which neither the scanning side IC nor the signal side IC is connected as shown in FIG. 4 (to be described hereinafter).

For the liquid crystal cell 14 having a structure described immediately above, since the electric lead lines 4 still remains exposed after the scanning side IC 15 and the signal side IC 16 have been connected to the cell 14 with the short-circuit section 5 removed, it is apprehended that the exposed portion might be brought into contact with conductors.

Even when a side in which neither the scanning side IC 15 nor the signal side IC 16 is disposed, specifically the side, in which the short-circuit section 5 is cut out, indicated by an arrow 17 in FIG. 4, is made to level with the sides of the upper and lower glass substrates 2 and 3 as shown in FIG. 5, the portion 4a of the electric lead line 4 is exposed, so that there is still a possibility of intrusion of static charges.

Meanwhile a Japanese Patent Laying-Open Application No. Hei-2-193,112 published on Jul. 30, 1990 discloses "a process for preparing an interconnecting substrate", in which short-circuit sections 5 of a liquid crystal cell are chamfered as shown in FIG. 6, so that, in a case where the cell is interconnected to another circuit substrate, the electric lead lines may not be damaged even if the interconnected electric lead lines meet the chamfered portion in the periphery of the interconnecting substrate.

To make a liquid crystal cell as shown in FIG. 6, however, necessitates an extra step of chamfering the periphery of the cell by, for example, blowing water jet, to the liquid crystal cell from which the peripheral short-circuit sections 5 have been removed, resulting in high cost.

SUMMARY OF THE INVENTION

It is therefore an object of the present invention to provide a dielectric display device in which, even when the aforementioned dielectric display device, such as, for example, a liquid crystal cell, is brought into contact with an external conductive material, intrusion of static electricity from electric lead lines can be prevented.

Another object of the present invention is to provide a process for preparing a dielectric display device, by which, in removing short-circuit sections of the dielectric display device, no static charge occurs. Further, no breakage of electric lead lines and no failure in connection of the lines is caused by the edges of the sides along which the short-circuit sections have been cut out. Also, the short-circuit sections are ready to be removed.

These and other objects of the present invention can be achieved by providing a dielectric display device comprising: a pair of substrates, at least one of which is transparent, spaced a constant distance, apart; a dielectric display material inserted between said pair of substrates; a pair of electrodes, at least one of which includes a plurality of line electrodes, each electrode being disposed on one of the respective substrates; a static erasing conductor disposed extending peripherally along, and being spaced in a constant distance from, ends of the line electrodes.

The process for preparing a dielectric display device according to the present invention comprises the steps of providing a pair of substrates, at least one of which is transparent, spaced a constant distance apart in parallel; inserting a dielectric display material between said pair of substrates; disposing a pair of electrodes, at least one of which includes a plurality of line electrodes, on the respective substrates; disposing a static erasing conductor extending peripherally along, and being spaced a constant distance from, ends of the line electrodes; and irradiating the transparent substrate with a laser beam so as to separate the static erasing conductor from the ends of the line electrodes.

In accordance with the present invention, a dielectric display material is inserted into a space between a pair of substrates, at least one of which is transparent, and a pair of electrodes facing each other are formed on these substrates. At least one of the electrodes is provided with a plurality of line electrodes. A static erasing conductor is disposed extending peripherally along, and spaced a constant distance from, the ends of the electrodes. With this arrangement, the ends of the electrodes of the dielectric display device will be electrostatically shielded by the static erasing conductor. Thus, the device is kept free from the effect of static electricity due to the external conductors.

In accordance with the present invention, a dielectric display material is inserted into a space between a pair of substrates, at least one of which is transparent, and a pair of electrodes facing each other are formed on these substrates. At least one of the electrodes is formed with a plurality of line electrodes, which in turn are connected at their ends in common with a conductor formed on a light-transmissive substrate. The conductor, to which electrodes are commonly connected, inhibits the influence of static electricity caused in, for example, a treatment of rubbing an orientation film. Subsequently, the light-transmissive substrates will be irradiated with a laser beam, to separate the conductor from the ends of the commonly connected electrodes. By this procedure, the substrates will not be damaged and the conductor remains left around the line electrodes. Thus, the electrode ends of the dielectric displays device are not brought into direct contact with an external conductor. In addition, as the electrodes are electrostatically shielded by the separated conductor, they will have no influence due to static electricity.

DESCRIPTION OF THE PREFERRED EMBODIMENTS

Now, an embodiment of the present invention will be described hereinafter.

Embodiment

Figure 1:
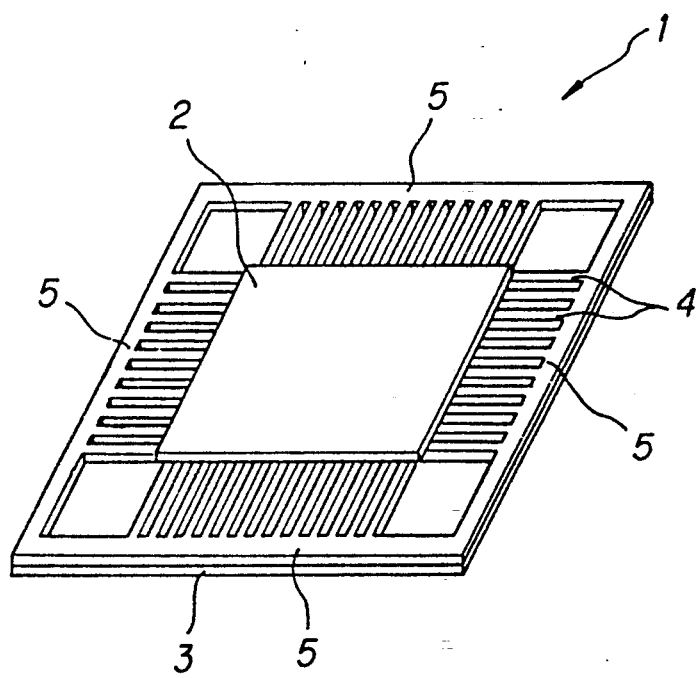
FIG. 1 is an perspective view showing a construction feature of a pair of substrates of a conventional dielectric display device.
Figure 2:
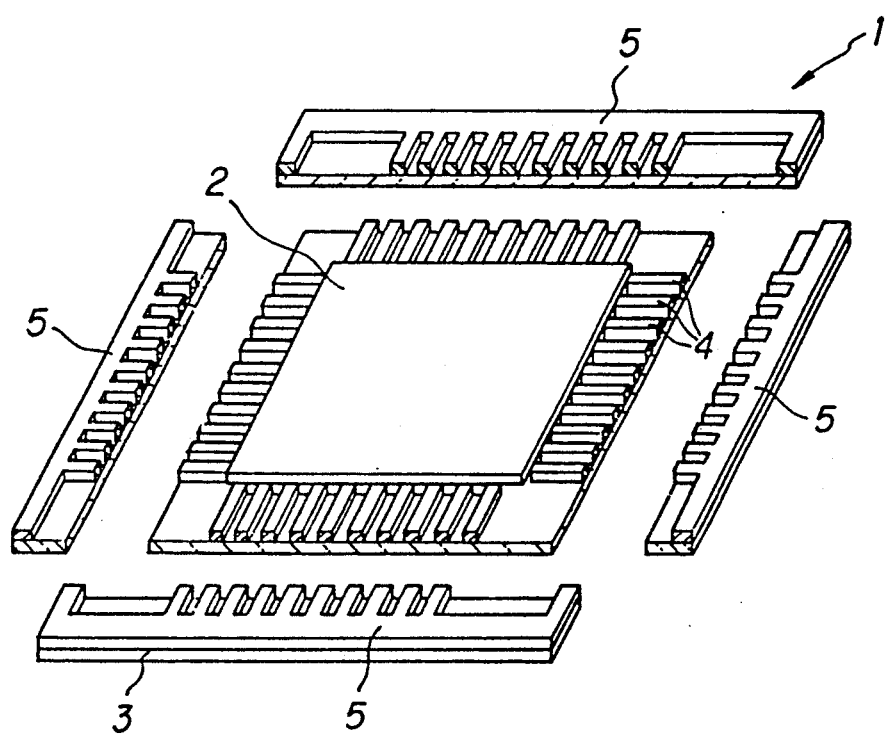
FIG. 2 is a perspective view showing a state in which peripheral short-circuit sections have been cut out from the dielectric display device in FIG. 1.
Figure 3:
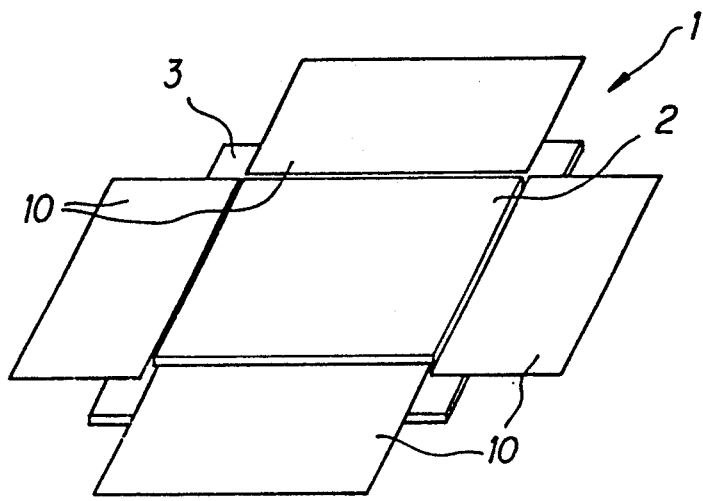
FIG. 3 is a perspective view showing a feature in which driver ICs are provided by the COF method for the dielectric display device shown in FIG. 2, from which the peripheral short-circuit sections have been removed.
Figure 4:
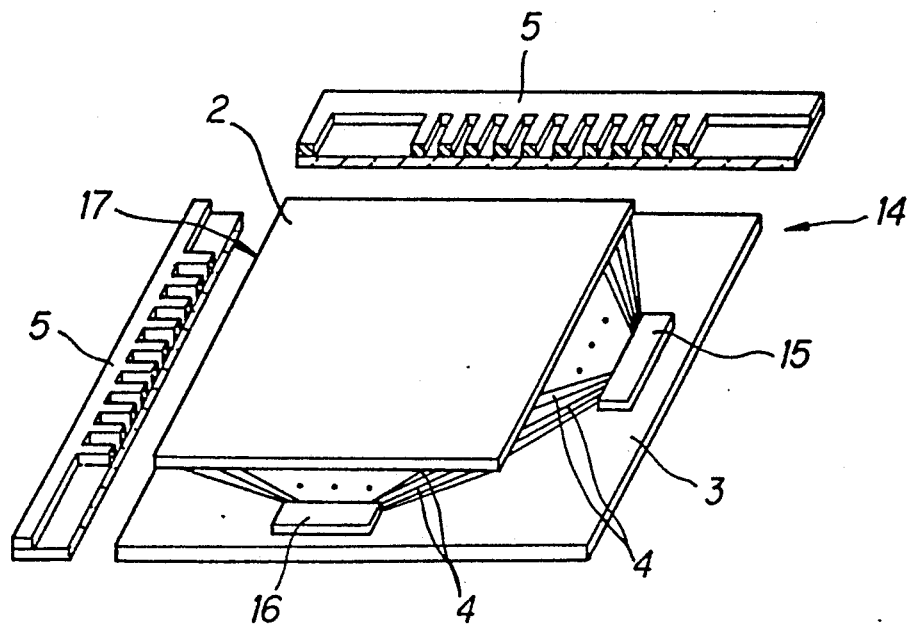
FIG. 4 is a perspective view showing a feature in which driver ICs are provided by the COG method for the dielectric display device shown in FIG. 2, from which the peripheral short-circuit sections have been removed.
Figure 5:
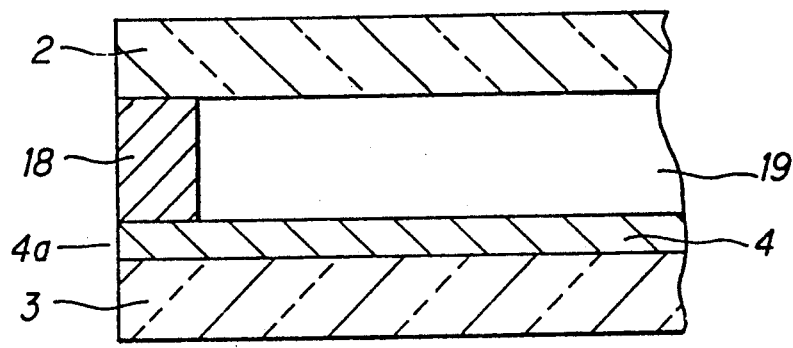
FIG. 5 is a partially enlarged sectional view showing the portion indicated by arrow in FIG. 4.
Figure 6:
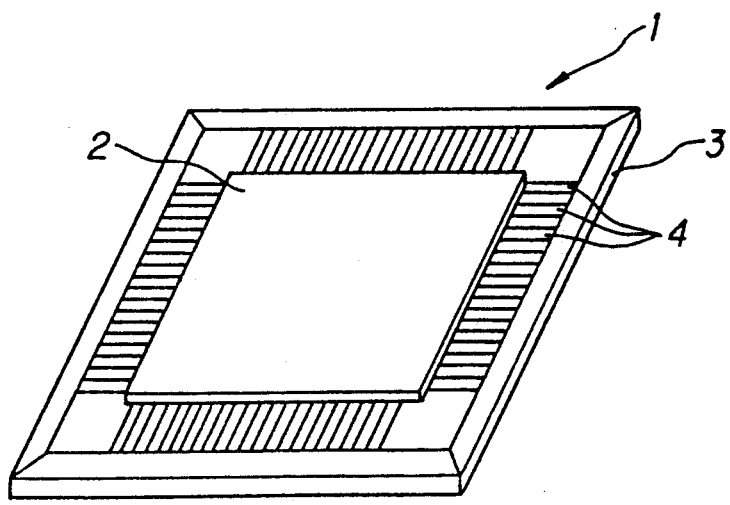
FIG. 6 is a perspective view showing a substrate structure of another conventional dielectric display device.
Figure 7:
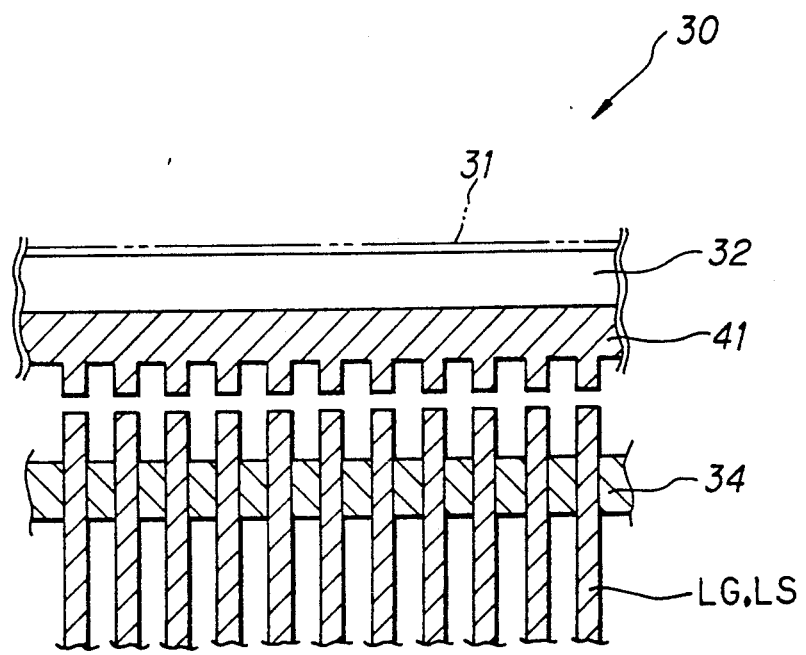
FIG. 7 is a partially enlarged plan view showing a portion of electrodes of an active matrix type liquid crystal cell according to an embodiment of the present invention.
Figure 8:
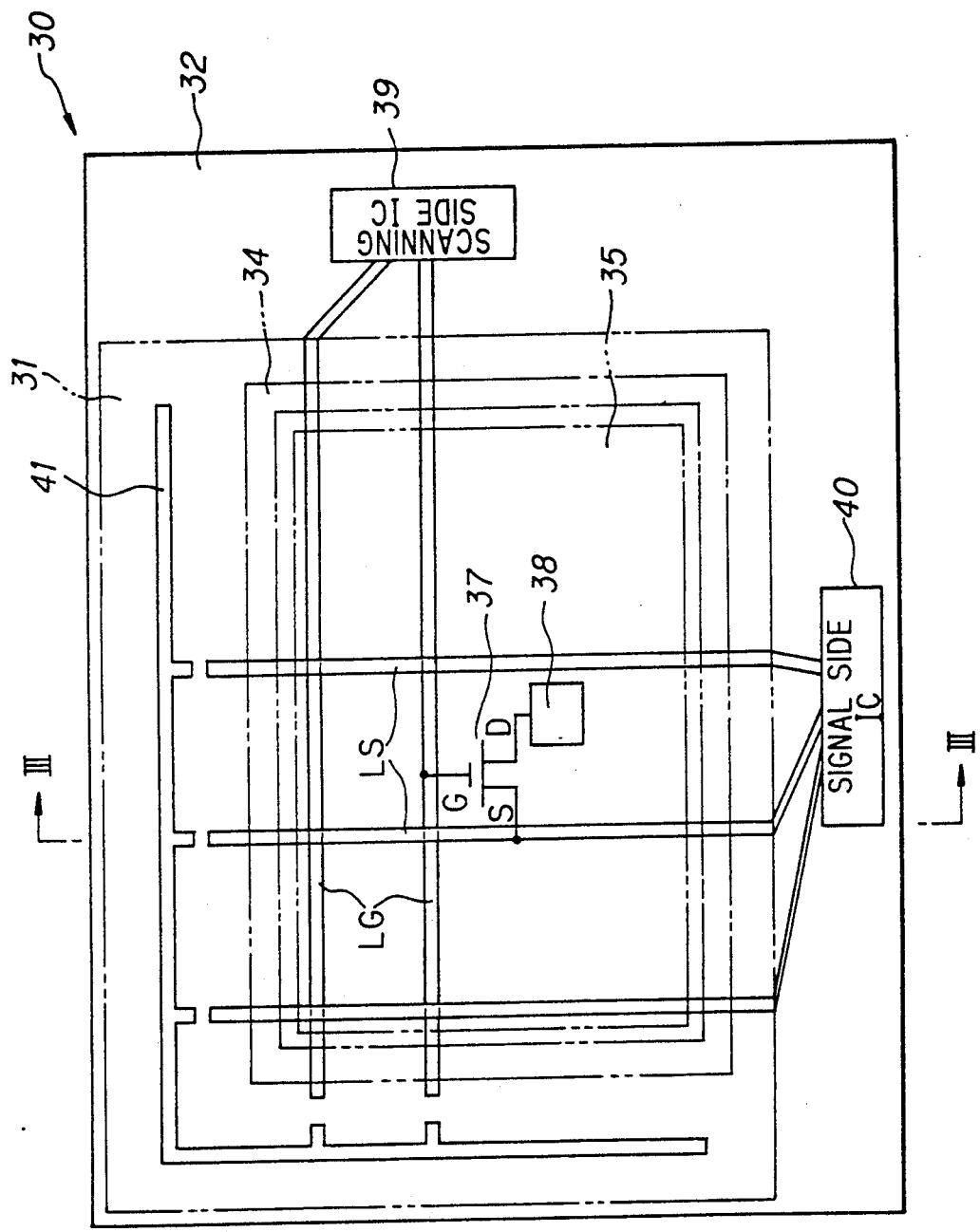
FIG. 8 is a plan view showing an overall configuration of the liquid crystal cell shown in FIG. 7.
Figure 9:
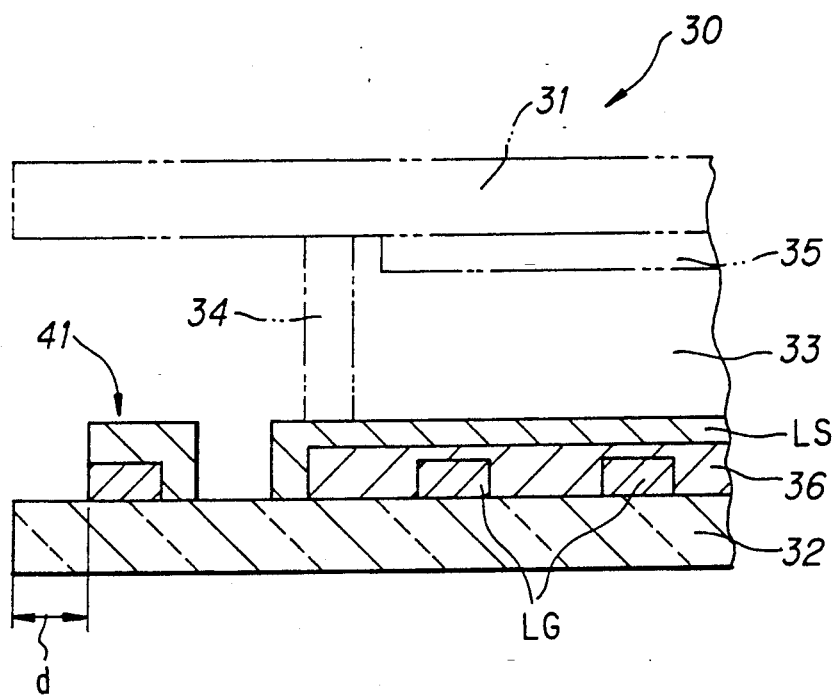
FIG. 9 is a partially sectional view of FIG. 8 taken along X—X line.

FIG. 7 is a partially enlarged plane view showing a structure of a portion of the electrodes of an active matrix type liquid crystal cell 30 (or display device) according to an embodiment of the present invention. FIG. 8 is a plan view showing an overall elemental configuration of the liquid crystal cell 30. FIG. 9 is a partially sectional view of FIG. 8 taken along X—X line. In the liquid crystal cell 30, there are disposed a pair of glass substrates 31 and 32, on facing sides of which are disposed respective electrodes. Between the glass substrates 31 and 32 a liquid crystal 33 is injected and hermetically sealed by an adhesive agent 34. In FIG. 9, the surface of the upper glass substrate 31 is covered in almost its entire area with a common electrode 35. The lower glass substrate 32 is provided, via an insulator film 36, with line electrodes for scanning LG (to be referred to as, simply, scanning electrodes LG) and electrodes for signals LS (to be referred to as, simply, signal electrodes LS) perpendicular with one another. In addition, a thin film transistor (TFT) 37 and a pixel electrode 38 are arranged at each of the intersections between these scanning and signal electrodes LG and LS. Here, the TFT 37 is a switching device for selectively applying the voltage to the pixel electrode 38.

A scanning side IC 39 and a signal side IC 40 are provided in a manner of the COG method on a the glass substrate 32, to drive the electrodes LG and LS. A signal for a scanning line generated from the scanning side IC 39 and a signal for a data line generated from the signal side IC are applied to a gate (G) and a source (S) of the TFT, respectively, to turn the electrode 38 on and off.

On the sides of the glass substrate 32 in which neither the scanning side IC 39 nor the signal side IC 40 is disposed, a static erasing conductor 41 is formed which extends peripherally along the ends of the electrodes LG and LS, being spaced a constant distance from each end of the electrodes LG and LS with a length "d" kept inside from the side edges of the glass substrate 32. The static erasing conductor 41 is formed at the same time that the electrodes LG and LS are formed on the glass substrate 32, and is separated from the electrodes LG and LS by a procedure which will be described hereinafter. FIG. 7 shows that the static erasing conductor 41, indicated by a right-sloped hatching, is formed along the ends of the electrodes LG and LS which are also indicated by the same right-sloped hatching.

The static erasing conductor 41 is formed in the same process in which the electrodes LG and LS and switching devices are formed on the glass substrate 32, by sputtering or an electron beam technique, and patterning the metal thin film consisting of, for example, Ta (tantalum) using photo-lithography. In this way, the formation of the static erasing conductor 41 can be done simultaneously with the formation of the gate electrodes of TFT 37.

Thus, the static erasing conductor 41 is provided on the substrate peripherally along the ends of the electrodes LG and LS with a constant distance kept from each end of the electrodes LG and LS, so that the ends of the electrodes LG and LS remain electrostatically shielded by the static erasing conductor 41 even when, for instance, the liquid crystal cell 30 would come in contact with conductors such as an operator's finger etc. in the process of forming the liquid crystal cell 30. By this, the TFT 37 can be protected from the static electricity from external conductors.

Figure 10:
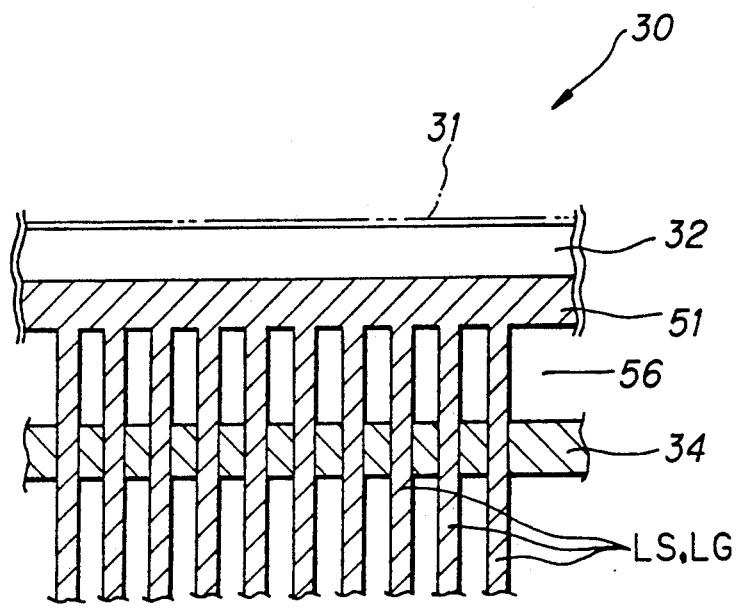
FIG. 10 is a partially enlarged plan view showing a structure of an electrode portion before a static erasing conductor shown in FIG. 8 has not yet been separated.
Figure 11:
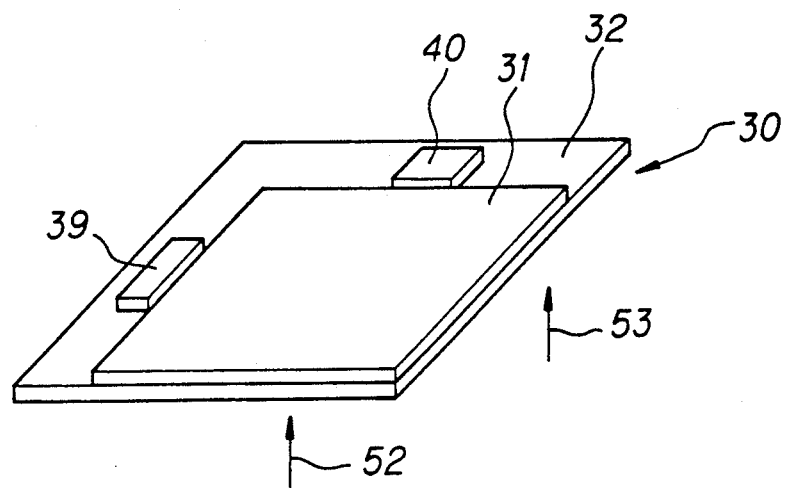
FIG. 11 is perspective appearance view showing a built-in state of the liquid crystal cell shown in FIG. 8.
Figure 12:
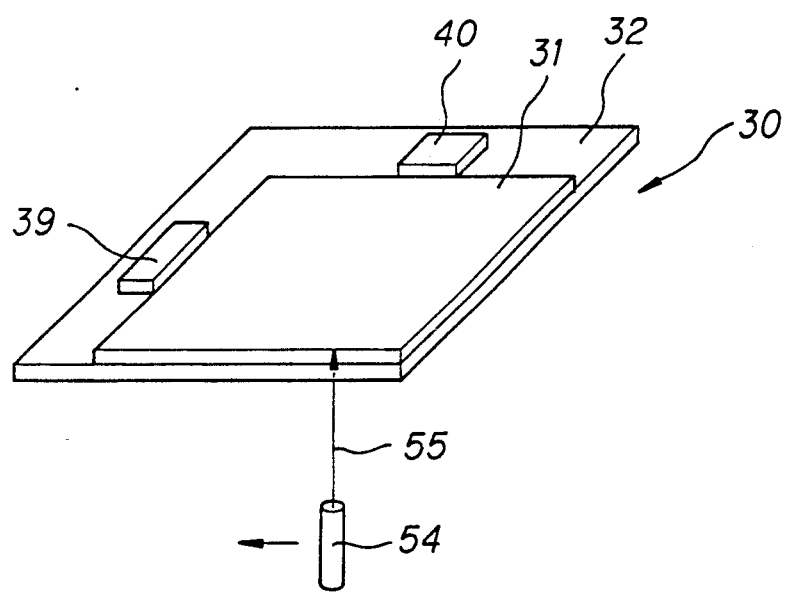
FIG. 12 is an illustration showing a method of cutting peripheral short-circuit sections of the liquid crystal cell shown in FIG. 8 by means of a laser beam.

Referring now to FIGS. 10, 11 and 12, an explanation will be made about the process for preparing a liquid crystal cell 30 having the static erasing conductor 41 described above. FIG. 10 is an enlarged plan view showing a structure of the electrode portion before the formation of the static erasing conductor 41, whereas FIG. 11 is a perspective appearance view of the liquid crystal cell 30 at the time. FIG. 12 is a view for illustrating the process of parting a short-circuit section 51 of the liquid crystal cell by means of a laser beam 55.

Referring to FIG. 10, the short-circuit section 51, to which all ends of the electrodes LG and LS, indicated by a right-sloped hatching, consisting of Ta are connected in common, is formed. This is done at the same time that the electrodes LG and LS are to be formed. Further, this is done on those sides of the lower glass substrate 32 in which neither the scanning side IC 39 nor the signal side IC 40 is arranged. The short-circuit section 51 is provided so that static charges caused by the orientation treatment and the like do not accumulate between the electrodes LG or the electrodes LS. Subsequently, the upper glass substrate 31 is fit in and applied, as shown in FIG. 11, to assemble the liquid crystal cell 30. Here, in this case, the short-circuit section 51 is formed on the sides indicated by arrows 52 and 53, of the liquid crystal cell 30.

Upon completion of the liquid crystal cell 30, the short-circuit section 51 is no longer needed. Thus, the short-circuit section 51 will be separated from each end of the electrodes LG and LS, as shown in FIG. 12, by irradiating the lower Glass substrate 32 with the laser beam 55 emitted from a laser source 54. The laser beam 55 is emitted in a position indicated by an arrow 56, or specifically in a position between an adhesive agent 34 indicated by a left-sloped hatching and the short-circuit section 51 indicated by a right-sloped hatching, to part the electrodes LG or LS from the short-circuit section 51.

With regard to the kind of laser beam 55, when, for example, the electrodes LG and LS are of Ta, 50 $\mu$m wide and 3000 Å thick, as in this embodiment, a XeF excimer laser can be used to irradiate with an energy density of 5 J/cm$^2$ or less in 15 nsec to cut the electrodes LG and LS without damaging the glass substrates 31 and 32. Electrodes LG and LS consisting of a metal other than Ta, will be able to be cut in a similar set-up condition.

Thus, the short-circuit section 51 is cut inside the liquid crystal cell 30 by the laser beam 55, and thereby, as shown in FIG. 7, the static erasing conductor 41 is formed outside, being spaced a constant distance from the ends of the electrodes LG and LS. Further, the upper and lower glass substrates 31 and 32 remain left outside the electrodes LG and LS.

With this structure, the electrodes LG and LS would not be touched directly from without by conductors such an operator's finger and the like. Thus, it is possible eliminate the effect of static electricity caused by the contact of such electric conductors. Moreover, the remaining static erasing conductor 41 works to electrostatically shield the electrodes LG and LS, so that it is possible to protect these electrodes against adverse effects due to external static electricity.

Although the explanation of this embodiment has been made regarding a transparent type liquid crystal cell, the present invention may be also applied to a reflection type or simple matrix type liquid crystal cell. The present invention is not limited to liquid crystal cells but can be applied generally to any display device susceptible to damage by static electricity.

As has been detailed above, according to the present invention, even though a dielectric display device (liquid crystal cell) comes into contact with an external conductor such as, for example, an operator's finger, contact portion in the processing apparatus, and the like, the electrodes portion is protected by the static erasing conductor. Thus, it is possible to prevent the static electricity, due to contact with such conductors, from penetrating into the cell from without.

According to the process for preparing a dielectric display device of the present invention, a laser beam is employed to separate a conductor or short circuit section from each of electrodes of the dielectric display device. The conductor or short circuit section is provided and connected in common with each of electrodes and is for preventing the accumulation of those static charges between the electrodes caused during the process of preparing the dielectric display device. Thus, the upper and lower substrates of the device are not damaged.

With this procedure, the substrates entirely remain unremoved and cover the end of the electrodes. This is unlike the conventional device in which both the upper and lower substrates are removed together with the short-circuit sections. Thus, conductors such as, for example, an operator's fingers and the like cannot touch the electrodes directly. Consequently, the effect of static electricity due to the contact of such conductors can be inhibited as compared to the conventional process. In addition, the short-circuit section parted from the electrodes works to shield the static electricity from without after being parted, so that it is possible to eliminate the adverse effect of static electricity in the steps after the short-circuit section has been parted.

What is claimed is:

1. A dielectric display device comprising:
   a pair of substrates, at least one of which is transparent, spaced a distance apart, in parallel to each other;
   a dielectric display material inserted between said pair of substrates;
   signal and scanning electrodes, at least one of said signal and scanning electrodes including a plurality of electrodes disposed in parallel on one of said pair of substrates;
   a static erasing conductor disposed peripherally along at least one of said pair substrates, being initially connected to ends of each of said electrodes disposed in parallel to allow for release of static electricity from the electrodes through the connected static erasing conductor, and being subsequently separated by a laser and being maintained at a constant distance from ends of said electrodes disposed in parallel, to thereby shield the electrodes disposed in parallel from subsequent externally generated static electric effects.

2. The dielectric display device of claim 1, wherein said plurality of electrodes disposed in parallel comprise a group of scanning electrodes and a group of signal electrodes connected respectively with gate electrodes and source electrodes of thin film transistors (TFTs) disposed on the transparent substrate; each of said scanning electrodes and signal electrodes being connected at one end to a driver integrated circuit for driving scanning electrodes and a driver integrated circuit for driving signal electrodes, respectively; and said static erasing conductor being disposed peripherally along, and spaced at a constant distance from, the other ends of each of the scanning electrodes and signal electrodes to thereby shield each of the scanning electrodes and signal electrodes from subsequent externally generated static electric effects.

3. A method of forming a dielectric display device comprising the steps of:
   (a) forming a pair of substrates, at least one of which is transparent, in parallel, spaced a constant distance apart;
   (b) inserting a dielectric display material between the pair of substrates;
   (c) disposing signal and scanning electrodes on the substrates, at least one of the signal and scanning electrodes including a plurality of electrodes disposed in parallel on one of the pair of substrates;
   (d) disposing a static erasing conductor peripherally along at least one of the pair of substrates;
   (e) connecting the static erasing conductor to ends of each of the electrodes disposed in parallel to allow for release of static electricity from the electrodes through the connected static erasing conductor;
   (f) separating the static erasing conductor from the ends of each of the electrodes disposed in parallel by a laser; and
   (g) maintaining the separated static erasing conductor, at a constant distance from the ends of each of the electrodes disposed in parallel, peripherally along at least one of the pair of substrates, to thereby shield the electrodes disposed in parallel from subsequent externally generated static electric effects.

4. The method of claim 3, wherein,
   said step (c) includes disposing signal and scanning electrodes on the substrates, both of which include a plurality of electrodes disposed in parallel on at least one of the pair of substrates, each of the scanning and signal electrodes being connected at one end to a driver circuit, and
   wherein said steps (d)-(g) include disposing, connecting, separating, and maintaining, respectively, said static erasing conductor with respect to other ends of each of the scanning and signal electrodes.

* * * * *